United States Patent
Weber

(10) Patent No.: US 11,708,033 B2
(45) Date of Patent: Jul. 25, 2023

(54) LOADING SPACE DEVICE FOR A FRONT END OF A MOTOR VEHICLE

(71) Applicant: Daimler AG, Stuttgart (DE)

(72) Inventor: Hanno Weber, Kirchheim/Teck (DE)

(73) Assignee: Daimler AG, Stuttgart (DE)

( * ) Notice: Subject to any disclaimer, the term of this patent is extended or adjusted under 35 U.S.C. 154(b) by 28 days.

(21) Appl. No.: 17/619,847

(22) PCT Filed: May 6, 2020

(86) PCT No.: PCT/EP2020/062492
§ 371 (c)(1),
(2) Date: Dec. 16, 2021

(87) PCT Pub. No.: WO2020/254032
PCT Pub. Date: Dec. 24, 2020

(65) Prior Publication Data
US 2022/0348143 A1  Nov. 3, 2022

(30) Foreign Application Priority Data
Jun. 17, 2019  (DE) ..................... 10 2019 004 286.7

(51) Int. Cl.
*B60R 5/02*  (2006.01)
*B60R 7/02*  (2006.01)

(52) U.S. Cl.
CPC . *B60R 5/02* (2013.01); *B60R 7/02* (2013.01)

(58) Field of Classification Search
CPC .... B60R 5/02; B60R 5/04; B60R 7/02; B62D 25/105; B62D 25/12
(Continued)

(56) References Cited

U.S. PATENT DOCUMENTS 5,301,992 A * 4/1994 Whitmore ................. B60R 5/04
296/26.1
11,208,046 B2 * 12/2021 Liu ....................... B62D 25/087
(Continued)

FOREIGN PATENT DOCUMENTS

DE       196 20 294 A1   11/1997
DE   10 2015 220 648 A1   4/2017
(Continued)

OTHER PUBLICATIONS

PCT/EP2020/062492, International Search Report dated Jul. 2, 2020 (Two (2) pages).
(Continued)

*Primary Examiner* — Jason S Daniels
(74) *Attorney, Agent, or Firm* — Crowell & Moring LLP

(57) ABSTRACT

A loading space device of a front end of a motor vehicle includes a loading space which is displaceable between a stowage position accommodated in the front end and an access position extended at least partially out of the front end. A delimiting wall configured as a flap delimits the loading space and in the access position of the loading space is displaceable to a loading position. The flap is configured as a covering element to cover, in the loading position, a component of the front end disposed in a longitudinal direction of the motor vehicle in front of the loading space. In the access position, as opposed to the stowage position, the loading space is disposed sloping towards an exterior of the motor vehicle.

8 Claims, 3 Drawing Sheets

(58) Field of Classification Search
USPC .............................................. 296/24.45, 37.1
See application file for complete search history.

(56) References Cited

U.S. PATENT DOCUMENTS

| 11,400,864 B2* | 8/2022 | Kim .......................... B60R 5/02 |
| 2022/0234507 A1* | 7/2022 | Kowollik ................. B60R 5/02 |

FOREIGN PATENT DOCUMENTS

| DE | 10 2017 004 263 A1 | 12/2017 | |
|----|----|----|----|
| DE | 10 2017 010 161 A1 | 7/2018 | |
| DE | 10 2017 011 984 A1 | 6/2019 | |
| DE | 102018208799 A1 * | 12/2019 | |
| DE | 102019000158 A1 * | 7/2020 | ............... B60R 5/02 |
| DE | 102019004010 A1 * | 12/2020 | ............... B60R 5/02 |

OTHER PUBLICATIONS

German-language Office Action issued in German application No. 10 2019 004 286.7 dated Jan. 28, 2020 (Six (6) pages).

* cited by examiner

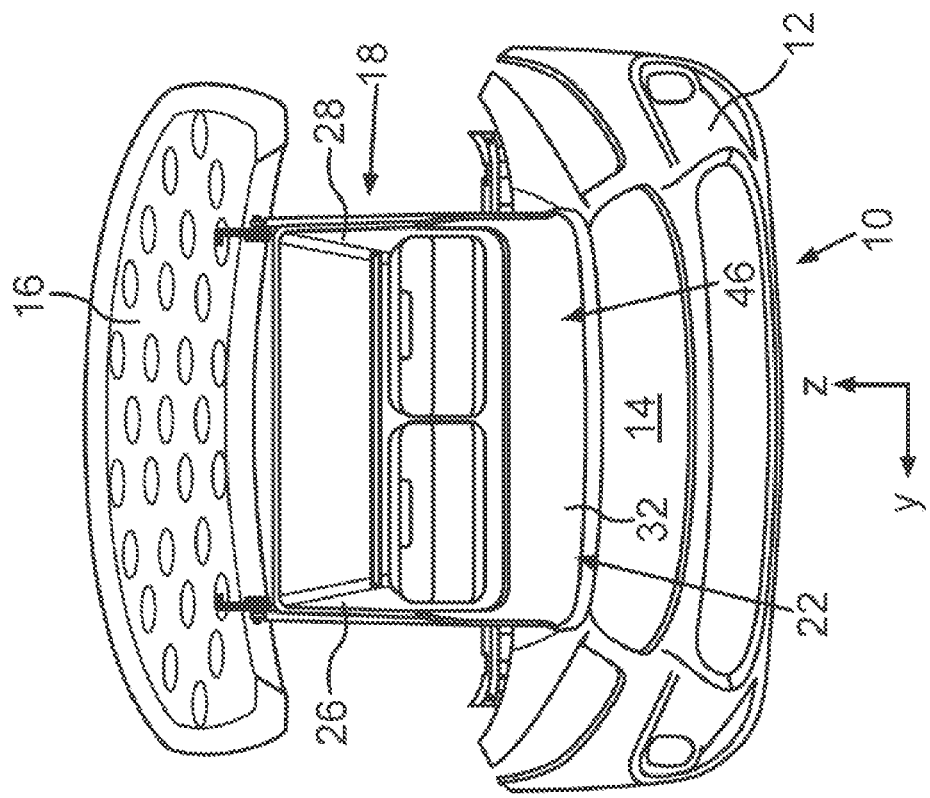
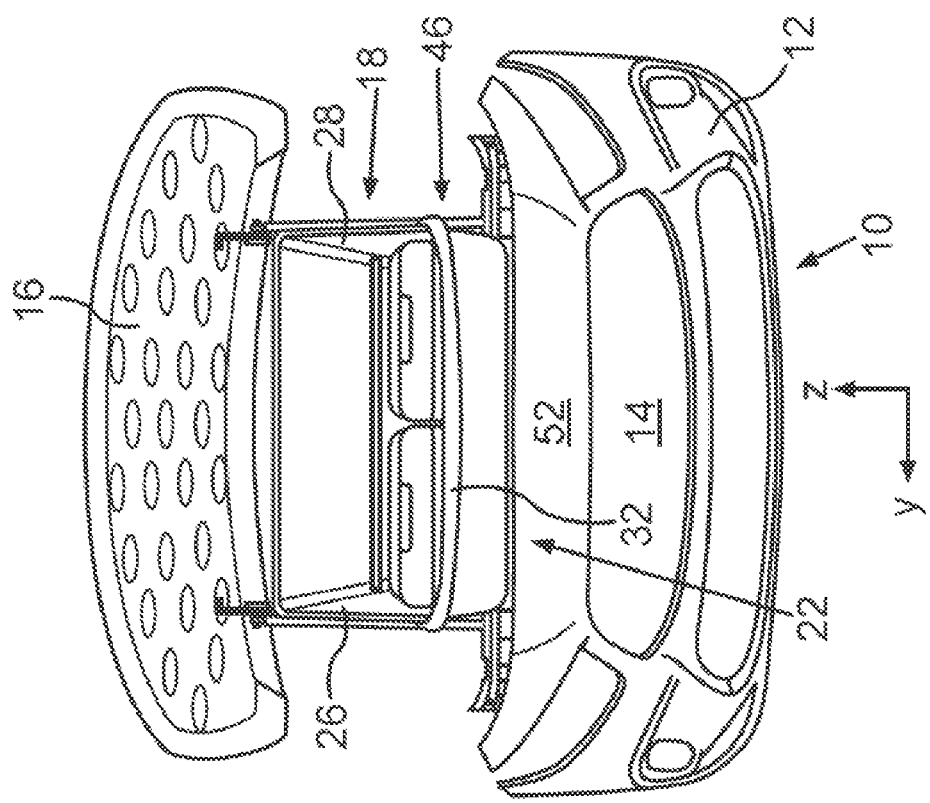

LOADING SPACE DEVICE FOR A FRONT END OF A MOTOR VEHICLE

BACKGROUND AND SUMMARY OF THE INVENTION

The invention relates to a loading space device for a front end of a motor vehicle.

In motor vehicles with electric drive, omission of the relatively large combustion engine leads to a space saving in the region of the front end of the motor vehicle, which can be utilized for arranging a loading space. However, loading spaces of this kind in the region of a front-end space of the front end closable by a front lid have the disadvantage that these often extend in the vertical direction of the vehicle very deeply into the front-end space of the front end and therefore loading and unloading are relatively uncomfortable, as the person standing in front of the motor vehicle must bend widely over into the front end and downwards. To avoid this, in generic DE 10 2017 004 263 A1 it is proposed to configure the loading space as a kind of tub or box, which is displaceable by means of a displacement device between a stowage position occupied in the front end and an access position extended at least partially out of the front end. The known loading space device further comprises an integrated loading sill protector, which may have an extendable roller protector, a folding mat or a flap arranged at the front of the loading space.

DE 10 2017 011 984 A1 presents a motor vehicle with a luggage compartment provided in the front region of the vehicle body underneath a front opening, which has a container that can be swivelled in front of the front region of the vehicle by means of a lifting device, to make it more accessible.

The aim of the present invention is to provide a loading space device of the kind stated at the beginning, which can be loaded or unloaded particularly ergonomically and comfortably.

The loading space device according to the invention comprises a displacement device, by means of which the loading space is displaceable between a stowage position occupied in the front end under a front lid and—with the front lid opened—an access position extended at least partially out of the front end. As a result, the loading space can first be brought into a position in which loading and unloading can take place more easily than in the stowage position. Furthermore, the loading space is configured substantially as box-shaped or tub-shaped and therefore has a delimiting wall, by which the loading space is at least partially surrounded or delimited. The delimiting wall is configured as a preferably dimensionally stable flap, which is preferably mounted swivelling about an axis, and in the access position of the loading space can be displaced, in particular swivelled, to a loading position. In this loading position, the loading space is accessible not only from above, but also from the flap side. The displacement of the flap may in certain circumstances also take place during the displacement movement of the loading space.

By moving the flap into the loading position, the loading space is made more accessible, thus making loading and unloading easier. In addition, owing to this flap, a person who is engaged in the loading or unloading operation does not have to bend excessively over the front end or into the front-end space of the motor vehicle, and therefore the risk of soiling of the person's clothing is reduced. The accessibility of the loading space is improved even more, because in the access position, as opposed to the stowage position, the loading space is arranged sloping towards the vehicle exterior.

Here, the flap is configured as a covering element, by means of which, with the flap in the loading position, front-end components arranged in the longitudinal direction of the vehicle in front of the loading space can be covered. The respective components may be for example a so-called "soft nose" or similar panel element or respective cross-member elements, on which a front-lid lock of a front lid is arranged. The flap thus has a dual function, namely on the one hand delimitation of the loading space as part of the delimiting wall and on the other hand protection of the components in the region in front of the loading space, which is in its access position.

In the context of the present invention, the term "soft nose" means an upper end region of the bumper panel, which extends at the end forwards as an extension of the front lid. The front lid thus no longer ends at the front on the front wall formed by the bumper panel or the upper end of a radiator grille, but at a gap from an end region of the bumper panel as an extension of the front lid. Usually the bumper panel or the upper end region thereof is supported at least indirectly on a frame element of a front-end bracket for holding or forming an associated front end.

In an advantageous embodiment of the loading space device, it is envisaged that in the loading position, the flap extends forwards in the longitudinal direction of the vehicle beyond a front wall region of the front end. Thus, corresponding front-end components between the front wall region and the loading space may be covered completely from above, to achieve especially favourable protection against soiling.

In addition, it has proved advantageous if the flap has an edge which, with the flap in the loading position, covers the front wall region of the front end. In other words the flap is formed diagonally by the edge, so that respective front-end components, which are arranged in front of the loading space extended in the access position, are not only covered from above, but in addition also the corresponding front wall region of the front end.

A further advantageous embodiment of the invention envisages that in the loading position, the flap can rest on at least one of the front-end components arranged in the longitudinal direction of the vehicle in front of the loading space. As a result, an especially stable arrangement is created in the loading position, so that for example no damage can be done if a person rests on the flap.

Furthermore, it has proved advantageous if the loading space is displaceable forwards from the stowage position to the access position in the longitudinal direction of the vehicle. As a result, an especially favourable accessibility to the loading space from in front may be created.

In addition, it has proved advantageous if the flap forms a front end face of the delimiting wall that is at least substantially rectangular in cross-section. Thus, in particular a loading space displaced forwards into the access position can be loaded particularly favorably.

A further advantageous embodiment of the invention envisages that the flap comprises lateral cheeks, which, with the flap in the closed position, in each case fit flush on relevant side walls of the loading space. Owing to these cheeks, the loading space is also correspondingly delimited laterally when the flap is in the loading position.

Finally, it has proved advantageous if the loading space is configured as a box open at the top, for closing by means of a front lid of the front end. This allows a particularly simple configuration of the loading space.

Further advantages, features and details of the invention can be seen from the following description of a preferred embodiment example and from the drawing. The features and combinations of features stated above in the description and the following features and combinations of features stated in the description of the figures and/or only shown in the figures are usable not only in the combination presented in each case, but also in other combinations or alone, while remaining within the scope of the invention.

BRIEF DESCRIPTION OF THE DRAWINGS

FIGS. 3a, 3b are respective perspective front views obliquely from above, of the loading space device of the detail of the front end similar to FIGS. 3a and 3b, wherein the loading space is once again shown in each case in its access position displaced forwards and upwards and its flap is shown in FIG. 3a in its closed position and in FIG. 3b in its loading position.

DETAILED DESCRIPTION OF THE DRAWINGS

Figure 1A:
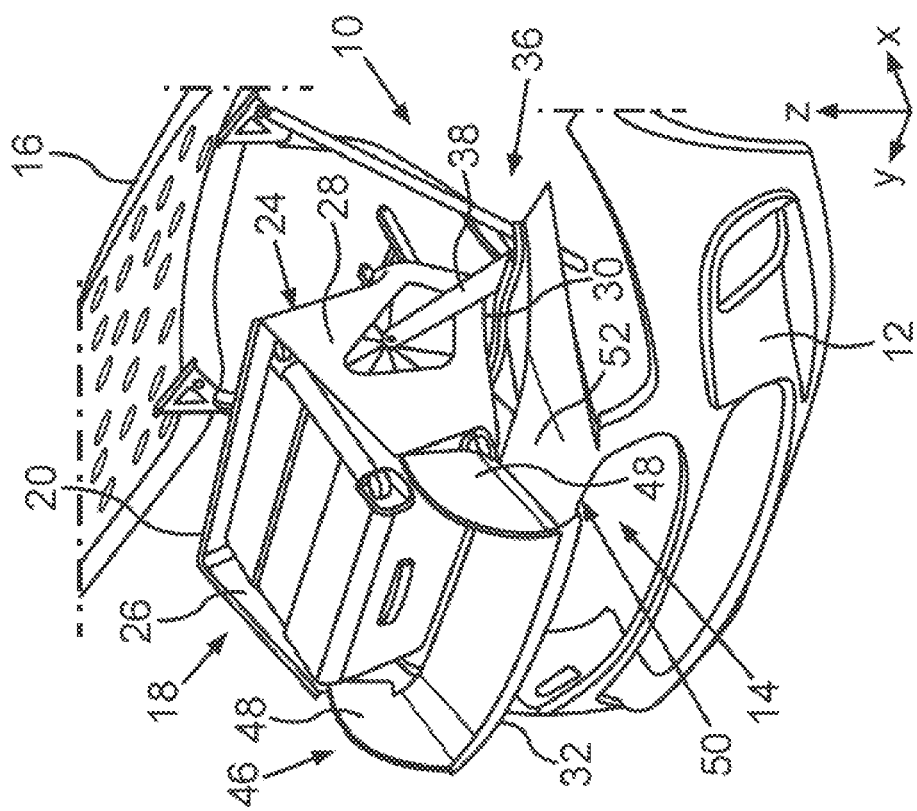
FIGS. 1a, 1b are respective perspective views of a loading space device of a detail of the front end of a passenger car with a loading space delimited by a delimiting wall and open at the top, which is movable by means of a displacement device between a stowage position accommodated in the front end and covered with a front lid, and an access position extended at least partially out of the front end in the vertical direction of the vehicle upwards or forwards in the longitudinal direction of the vehicle, wherein the delimiting wall of the loading space comprises a flap, which is displaceable from a stowage position shown in FIG. 1a to an access position shown in FIG. 1b.
Figure 1B:
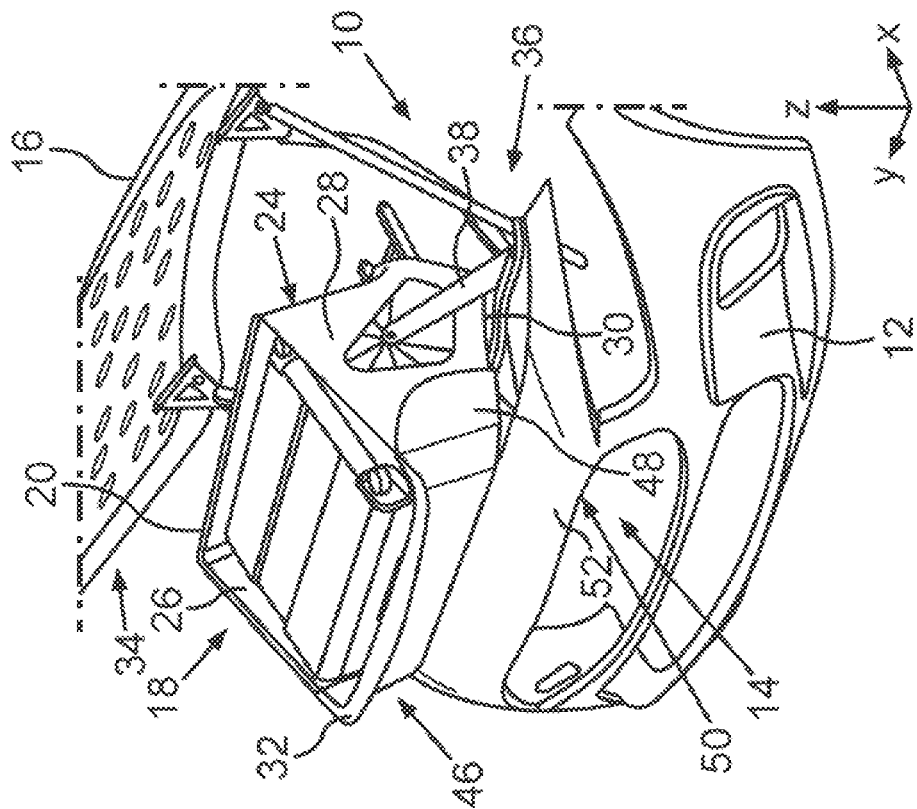

FIGS. 1a and 1b show in each case a perspective view of a loading space device for a front end 10 of a motor vehicle, in the present case an exclusively electric-drive motor vehicle (BEV) or a vehicle provided with a hybrid drive (PHEV). As can be seen, the front end 10 has in particular a bumper panel 12, which delimits or surrounds a front-end space 14 delimited by the front end 10 in a front upper region. At the top, the front-end space 14 is closed by a front lid 16, also shown as a detail, which is currently shown in its open position.

In the present case, a roughly box-shaped or tub-shaped loading space 18 of a loading space device can be seen, which has a rectangular bottom surface or base and is adapted to a receiving space within the front-end space 14. In the present case, the loading space 18 is delimited by a delimiting wall 20 at the outer periphery and at the bottom. Accordingly, the delimiting wall 20 comprises a front end wall region 22, a rear end wall region 24 and respective side wall regions 26, 28, extending at least substantially in the longitudinal direction of the vehicle or in the vertical direction of the vehicle. Moreover, the delimiting wall comprises a bottom region 30.

In the present case, the loading space 16 is displaceable from a stowage position, not shown here, in which it is accommodated in the assigned receiving space within the front-end space 14, to the access position shown, at least partially extended or displaced from the front end 10 or the front-end space 14. In the present case, for this purpose the loading space 16 undergoes a displacement movement in the vertical direction of the vehicle (z-direction) and in the longitudinal direction of the vehicle (x-direction) forwards and upwards. These two displacement movements may either take place successively or in the form of a superimposed movement.

In the stowage position, which is not shown, for example and in particular it is conceivable that an upper edge 32 of the delimiting wall 20 of the loading space 18 extends at least substantially in parallel to an underside 34 of the front lid 16, if the latter is in its closed position. Optionally, the edge 32 may lock directly with the underside 34 of the front lid 16, which is in the closed position, so that the loading space 18 is at least substantially closed by the front lid 16. Optionally, the loading space 18 may also be closed with a separate lid.

In the present case, the loading space 18 is displaced from the stowage position to its extended access position in such a way that the loading space 18 is tilted obliquely forwards. In the present embodiment example, the respective lateral edge regions of the edge 32 extend above the respective side wall regions 26, 28 for example at an angle of about 20 to 40 degrees to the horizontal.

Figure 2A:
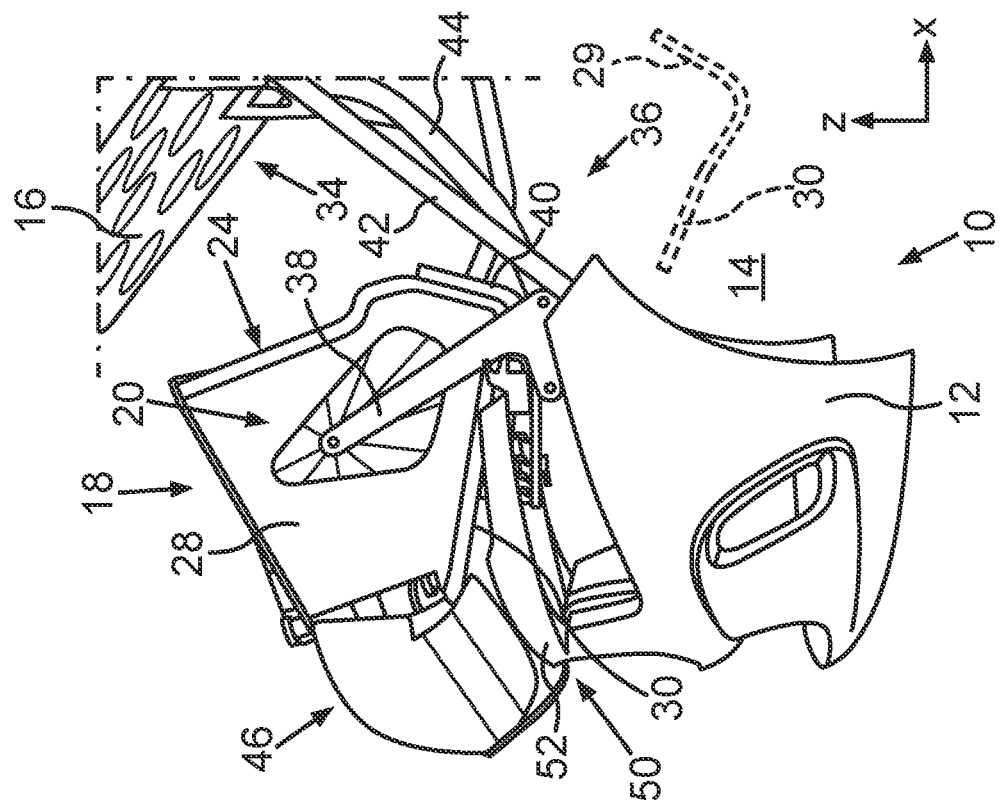
FIGS. 2a, 2b are respective side views of the loading space device similar to FIGS. 1a and 1b, wherein once again the loading space is in each case shown in its upwards-displaced access position and its flap is shown in FIG. 2a in its closed position and in FIG. 2b in its loading position.
Figure 2B:
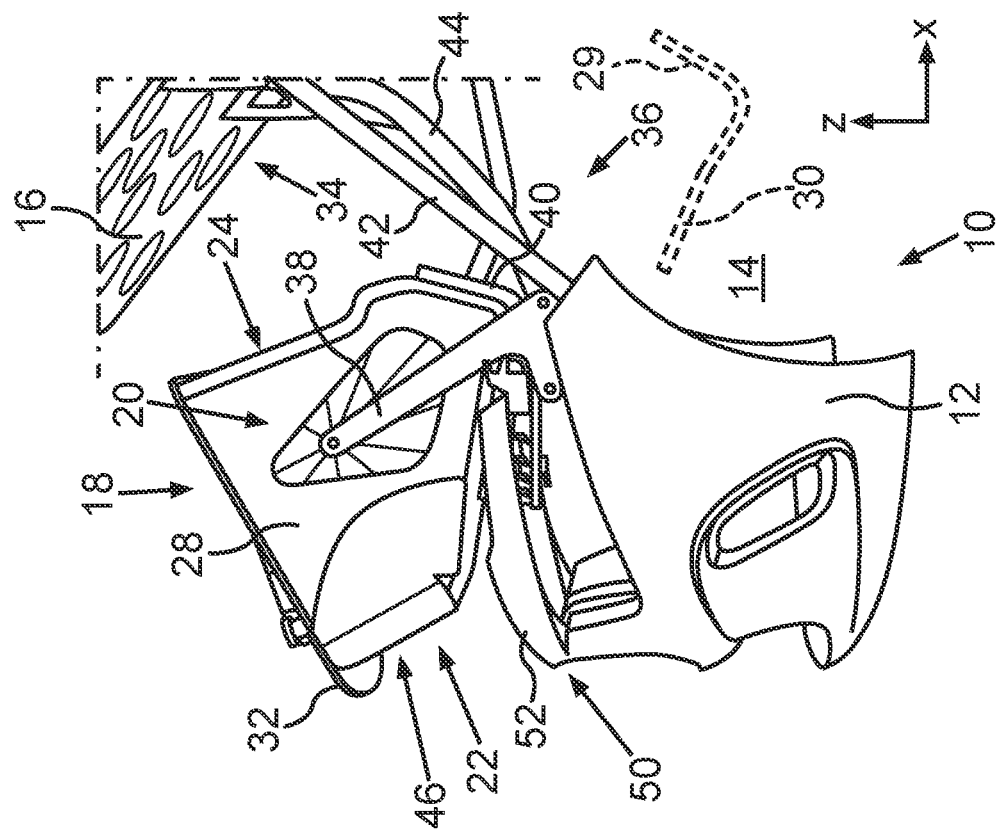

In the present case, the displacement movement of the loading space 18 takes place by a displacement device 36 shown in particular in FIGS. 2a and 2b in a respective cut-out side view of the front end or of the loading space device, which in particular comprises respective hand levers 38, which are coupled in each case in the corresponding side wall region 26, 28 of the loading space 18. In a rear lower region, a further linkage device 40 can be seen, which interacts with the hand levers 38 so that the loading space is for example displaceable in a parallelogram-like fashion from the stowage position to the access position also shown here. A part of the delimiting wall 20, more precisely a rear part of the bottom region 30 or a lower part of the rear end wall region 24 are indicated in FIGS. 2a and 2b in the stowage position of the loading space 18.

Furthermore, in the present case the displacement device 36 comprises respective levers 42, 44, which are coupled on the one hand on the front lid 16 and on the other hand on the hand levers 38 or the linkage device 40. By means of these coupled levers 42, 44, the displacement movement of the loading space 18 is coupled to the opening or closing movement of the front lid 16. Therefore in the present case the loading space 18 is displaced from its stowage position to the access position shown, if the front lid 16 is displaced from its closed position to its open position shown here. Conversely, the loading space 18 is displaced from the access position shown here to its stowage position if the front lid 16 is moved from the open position shown here to its closed position, which is not shown.

However, this coupling of the displacement movement of the loading space 18 to the opening or closing movement of the front lid 16 is not strictly necessary. Rather it would also be conceivable for the displacement movement of the loading space 18 to be able to take place independently of the movement of the front lid 16. In a simple embodiment, for example the loading space may be displaced manually between the positions. A partially manual solution, for example supported by the spring force of respective gas-filled telescopic struts during the displacement movement of the loading space 18 from out of or into the front-end space 14 would be conceivable, so that a corresponding manual displacement is facilitated. In addition, other drives would also be conceivable, which for example are activatable by a user or are switchable automatically.

Now, in order to make the loading or unloading of the loading space 18 particularly easy and comfortable, it is envisaged here that the delimiting wall 20 of the loading space 18 comprises a flap 46, which in the access position of the loading space 18 is displaceable from a closed position shown in each case in FIG. 1a or 2a to an open position shown in the respective FIG. 1b or 2b. In the present case the flap 46 forms the complete front end wall region 22 and is displaceable through for example an angle of about 70 degrees to 120 degrees about a swivel axis, which extends roughly horizontally between the bottom region 30 and the front end wall region 22 in the transverse direction (y-direction) of the vehicle.

Moreover, it can be seen from the figures that the flap has lateral cheeks 48, which in the present case extend roughly in circular segment fashion over an angle of about 120 degrees. The present statements of angles should not, however, be understood as limiting, and other ranges of angles are also conceivable.

The cheeks 48 extend at least substantially parallel and contiguous with the outside of the respective side wall regions 26, 28 of the delimiting wall 20 of the loading space 18. As a result, also when the flap 46 is folded down, which is then located in its loading position, it is easy to load the loading space 18.

Furthermore, it can be seen in particular from FIGS. 1b and 2b that the edge 22 in the region of the flap 46, with the flap 46 in the loading position, overlaps a front wall region 50 of the front end 10, more precisely of an upper transverse element 52 of the bumper panel 12, downwards in the vertical direction of the vehicle (z-direction). In the present case, the transverse element 52 is a part of the bumper panel 12, which is also designated as "soft nose". A "soft nose" of this kind is characterized by its relatively high position, so that the gap or the joints between this part of the bumper panel and the adjoining front lid moves closer in the direction of the windscreen. As a result, the loading space is even farther from the person standing in front of the vehicle. In its closed position, the transverse element 52 extends forwards as an extension of the front lid 16.

Moreover, it can be seen from FIGS. 1b and 2b that in the loading position, the flap 46 extends forwards in the longitudinal direction of the vehicle (x-direction) beyond the front wall region 50 of the front end 10. This configuration of the flap 46 as a covering element therefore means that during loading or unloading of the loading space 18, the transverse element 52 or some other component of the front wall region 50 or some other component of the front end 10 may be scratched or similarly damaged for example by suitcases or other objects. Therefore in the present case the flap 46 has a dual function, namely on the one hand to ensure easier access to the loading space 18 and on the other hand to protect front-end components 10 that are located in the loading and unloading region of the loading space 18 from being damaged. In this case the flap 46 also prevents soiling of the user's clothing, as it does not come directly into contact with components of the front wall region 50 or other parts of the outer panelling of the front end 10.

In order to achieve particularly favourable support of the flap 46 in its loading position, this may for example be supported on at least one of the components arranged in the longitudinal direction of the vehicle (x-direction) in front of the loading space 18, for example the transverse element 52 of the front end 10. In this case corresponding buffers or the like may optionally be provided.

FIGS. 3a and 3b show, once again in a cut-out perspective front view, the front end 10 with the front lid 16 and the loading space 18, which is in the access position, wherein in FIG. 3a the flap 46 is closed and in FIG. 3b the flap 46 is open.

The invention claimed is:

1. A loading space device of a front end (10) of a motor vehicle, comprising:
   a loading space (18) which is displaceable between a stowage position accommodated in the front end (10) and an access position extended at least partially out of the front end (10); and
   a delimiting wall (20) configured as a flap (46) by which the loading space (18) is delimited and in the access position of the loading space (18) is displaceable to a loading position, wherein the flap (46) is configured as a covering element to cover, in the loading position, a component (52) of the front end (10) disposed in a longitudinal direction of the motor vehicle in front of the loading space;
   wherein, in the access position, as opposed to the stowage position, the loading space (18) is disposed sloping towards an exterior of the motor vehicle.

2. The loading space device according to claim 1, wherein in the loading position, the flap (46) extends forwards in the longitudinal direction of the motor vehicle beyond a front wall region (50) of the front end (10).

3. The loading space device according to claim 1, wherein the flap (46) has an edge (32) which, with the flap (46) in the loading position, overlaps a front wall region (50) of the front end (10).

4. The loading space device according to claim 1, wherein in the loading position, the flap (46) is supported on the component (52).

5. The loading space device according to claim 1, wherein the flap (46) forms a front end wall region (22) of the delimiting wall (20) that is at least rectangular in cross-section.

6. The loading space device according to claim 1, wherein the flap (46) comprises lateral cheeks (48) which, in a closed position of the flap (46), fit flush on respective side wall regions (26, 28) of the loading space (18).

7. The loading space device according to claim 1, wherein the loading space (18) is configured as a box open at a top which is closable by a front lid (16).

8. The loading space device according to claim 7, further comprising a coupling device via which the loading space (18) is coupled to the front lid (16) for displacement between the stowage position and the access position.

* * * * *